United States Patent
Latimer, Jr.

(10) Patent No.: US 7,080,012 B2
(45) Date of Patent: Jul. 18, 2006

(54) DYNAMIC TIME DIVISION MULTIPLEXING OF VOICE SIGNALS INTO ETHERNET DATA STREAMS OVER A WAN CIRCUIT

(75) Inventor: Kenneth J. Latimer, Jr., Kittery, ME (US)

(73) Assignee: Paradyne Corporation, Largo, FL (US)

( * ) Notice: Subject to any disclaimer, the term of this patent is extended or adjusted under 35 U.S.C. 154(b) by 481 days.

(21) Appl. No.: 10/054,246

(22) Filed: Jan. 23, 2002

(65) Prior Publication Data

US 2003/0014257 A1 Jan. 16, 2003

Related U.S. Application Data

(60) Provisional application No. 60/262,722, filed on Jan. 19, 2001.

(51) Int. Cl.
G10L 11/00 (2006.01)
G10L 19/00 (2006.01)
H04M 11/00 (2006.01)
H04J 3/16 (2006.01)
H04J 3/00 (2006.01)

(52) U.S. Cl. .............. 704/270; 704/201; 379/90.01; 370/468; 370/498

(58) Field of Classification Search ............ 704/270, 704/201; 379/93.08, 93.09, 100.15, 413.03; 709/207, 224, 236
See application file for complete search history.

(56) References Cited

U.S. PATENT DOCUMENTS

| | | | | |
|---|---|---|---|---|
| 4,587,651 A * | 5/1986 | Nelson et al. | ............... | 370/405 |
| 4,707,831 A * | 11/1987 | Weir et al. | ................... | 370/416 |
| 5,271,000 A * | 12/1993 | Engbersen et al. | ......... | 370/244 |
| 5,778,189 A * | 7/1998 | Kimura et al. | ............. | 709/236 |
| 5,812,786 A | 9/1998 | Seazholtz et al. | | |
| 5,841,777 A * | 11/1998 | Cohen | ........................ | 370/443 |
| 5,940,479 A * | 8/1999 | Guy et al. | ............... | 379/93.01 |
| 6,108,346 A * | 8/2000 | Doucette et al. | ............ | 370/450 |
| 6,243,377 B1 * | 6/2001 | Phillips et al. | .............. | 370/354 |
| 6,307,839 B1 * | 10/2001 | Gerszberg et al. | .......... | 370/235 |
| 6,366,589 B1 | 4/2002 | Naudus, Jr. et al. | | |
| 6,570,849 B1 * | 5/2003 | Skemer et al. | ........... | 370/230.1 |
| 6,577,631 B1 * | 6/2003 | Keenan et al. | .............. | 370/394 |
| 6,728,238 B1 * | 4/2004 | Long et al. | ................. | 370/352 |

OTHER PUBLICATIONS

Humphrey et al., "How xDSL Supports Broadband Services in the Home", IEEE Network, vol. 11, Issue 1, Jan-Feb. 1997, pp. 14-23.*

(Continued)

*Primary Examiner*—David Hudspeth
*Assistant Examiner*—Brian L. Albertalli
(74) *Attorney, Agent, or Firm*—Thomas, Kayden, Horstemeyer & Risley LLP (57) ABSTRACT

The present invention injects and/or removes voice data into and/or out-of an Ethernet stream in a dynamic, Time Division Multiplexer-like manner, thus providing optimum quality Voice with minimal impact on data bandwidth.

20 Claims, 8 Drawing Sheets

OTHER PUBLICATIONS

IBM Technical Disclosure Bulletin, "Algorithm for Voice and Data Transmission in Hybrid Switches", vol. 31, No. 6, May 1, 1989, pp. 435-436, NN8905435.*

Downes, "Internetworking Technologies Handbook", Indianapolis:Cisco Press;Macmillan Technical Pub., 1998, 2nd ed., ISBN 1578701023.*

Lee, "An Integrated Transport Technique or Circuit and Packet Switched Traffic", INFOCOM '88. Networks: Evolution or Revolution? Proceedings, Seventh Annual Joint Conference of the IEEE Computer and Communications Societies, Mar. 27-31, 1988, pp. 110-111.*

Chao, "Design of Transmission and Multiplexing Systems for Broadband Packet Networks", IEEE Journal on Selected Areas in Communications, vol. 6, No. 9, Dec. 1988.*

Hornig, "Request for Comments: 894." RFC 894. Apr. 1984. Network Working Group <http://www.freesoft.org/CIE/RFC/894>.*

* cited by examiner

Fig. 1
Data Flow Through the System

Fig. 2 Packet Structure on the WAN Circuit

DYNAMIC TIME DIVISION MULTIPLEXING OF VOICE SIGNALS INTO ETHERNET DATA STREAMS OVER A WAN CIRCUIT

CLAIM OF PRIORITY

This application claims priority of and herein incorporates by reference in its entirety U.S. provisional patent application 60/262,722 filed on Jan. 19, 2001 entitled "Dynamic Time Division Multiplexing of Voice Signals Into Ethernet Data Streams Over A WAN Circuit."

FIELD OF THE INVENTION

The present invention generally relates to transmission of voice signals by way of Ethernet data streams over a WAN circuit.

BACKGROUND OF THE INVENTION

The present invention solves problems relating to transmission of Ethernet Frames and Voice Signals (Voice, Fax, Modem—hereinafter called "Voice" Signals) over a WAN Circuit in m a consistent manner (i.e. no Jitter) for Voice Signal Packets and therefore, preserves the quality of these signals while at the same time allowing for the maximum effective use of circuit bandwidth for the transmission of Ethernet Frames.

Ethernet Frames vary in size and can be over 1518 bytes in length. Frames of this size can monopolize a WAN Circuit causing degradation of the quality of Voice Signals sharing this circuit. A mechanism is therefore needed that allows for the maximum effective use of the bandwidth available in the WAN Circuit for both Voice and Ethernet Packets and which would ensure that Voice Signals never wait too long for the circuit. This mechanism should also operate with all standard Ethernet Frame sizes in a manner transparent to the attached Ethernet based communications devices.

Prior art systems and methods have employed the Local Subscriber Loop of the existing telecommunications infrastructure. Four types of prior art solutions exist that allow for the mixing of Voice Signals and Ethernet Signals on this circuit.

One prior art solution is to separate these signals within the spectrum available on the Local Subscriber Loop. This technique is used by systems which use frequency splitters (filters) to allow for low frequency analog Voice signals to co-exist on the Local Subscriber Loop with higher frequency digital data signals. This solution is widely deployed in the form of ADSL equipment with "POTS Splitters" (filters) attached at each end of the Local Subscriber Loop to enforce the separation of these frequency ranges.

The method used by ADSL equipment requires the addition of a filter circuit or POTS Splitter at each end of the Local Subscriber Loop. This separation of frequency bands on the media is not possible on other WAN circuit types such as SDSL, T1, and E1. In addition, the need to separate the spectrum of the analog Voice signals and the digital Ethernet signals on the same circuit requires partitioning of the spectrum in an asymmetrical manner. Digital signals coming downstream to the CPE device are provided at a faster rate than the digital signals going upstream from the CPE device. This asymmetrical data service creates problems for users who W want to transmit large files upstream, as the speed of the data transfer in that direction is significantly slower than the downstream speed.

A prior art second solution is to convert Voice and Ethernet packets to ATM Cells for transmission over the Local Subscriber Loop. Digitized Voice Packets and Ethernet Packets are segmented into 53 byte ATM Cells. These Cells share the Local Subscriber Loop and are transmitted using xDSL technology. There is usually a priority scheme that provides that Voice Packets traverse the circuit with acceptable delays. This method requires ATM switches, ATM backbones, and ATM Voice Gateways to complete the solution.

ATM developers compromised between the needs of LAN data devices and Voice equipment and defined circuits based on 53 byte cells (48 bytes of payload) and then developed solutions that would fragment Ethernet packets to fit into them. This payload size adds jitter to the Voice data that circuitry must correct. Their efforts included transmission of signals through large systems of equipment. This meant that they had to develop methods and protocols which would establish a circuit and with required characteristics these systems. These protocols add complexity to this solution. Developers approaching this problem from a traditional telephony perspective had available to them circuits with fixed channels and developed approaches that would fit Ethernet packets into these fixed channels.

The method used by ATM cell based equipment creates a significant overhead or "Cell Tax" on each Voice or Ethernet Packet sent over the Local Subscriber Loop. The size of these cells also produces jitter in the transmission of the Voice data that must be smoothed out by adding circuitry to the solution. In addition to the reduction in available circuit bandwidth lit created by the ATM overhead, the systems that use this approach also require complex and expensive ATM system elements throughout. ATM is costly to develop and to deploy and is complex to install, configure and maintain.

A third prior art solution is used over T1 or E1 WAN circuits. This solution requires that the circuit be channelized. The circuit is divided into fixed size Time Division Multiplexed channels. Each channel provides a virtual connection of 64 Kbps over the WAN circuit. Devices using this technique fragment the Ethernet Frame into packets that fit into these channel sizes. Voice packets are sent in the same size channels as Ethernet packets. The bandwidth of this circuit is apportioned by assigning these channels to Voice or Ethernet packets.

The T1/E1 "Drop and Insert" method requires a channelized WAN circuit. There is significant additional cost in terms of circuitry and packet processing overhead that makes this a costly solution. Due to its fixed channel assignment nature, the bandwidth of the WAN circuit may not be used effectively to support the mix of Voice and Ethernet packets required by the application. The channel assignments are fixed, and so go unused when there are no packets of the correct type to send.

A fourth prior art solution is called Voice Over IP (VOIP). This creates a type of IP packet to carry Voice data. These packets use all standard TCP/IP mechanisms to move through the network, including the WAN circuit. In addition, specific new protocol features are added to provide the "Quality of Service" (QOS) necessary for these Voice packets to traverse the network fast enough to maintain the quality of Voice signals.

VOIP developers are defining a system solution much like the ATM developers defined which would address large systems of equipment carrying mixed Ethernet Frames and Voice data. However, it does not focus on the Local Subscriber Loop. Additionally, VOIP requires that every element of the network infrastructure implement the same set of QOS features in order to produce reliable Voice support. The work to accomplish this through establishment of Standards and implementation of these Standards is underway but will require a long time and large expenditures to realize.

The present invention solves these and other problems in that it works with all existing Ethernet equipment as well as all existing analog Voice equipment requiring no changes in either. It can be deployed immediately and easily without the large expenditures necessary to modify or replace major elements of the supporting communications infrastructure.

SUMMARY OF THE INVENTION

The present invention injects and/or removes Voice data into and/or out-of an Ethernet stream in a dynamic, Time Division Multiplexer-like manner thus providing optimum quality Voice with minimal impact on Data bandwidth.

It is an object of the present invention to allow many services to be provided over the same network wherein the services are be easy to subscribe to and reconfigure under the control of the user of the services.

It is a further object of the present invention to supply a system and method that preserves the simplicity of Ethernet and adds to it a way to carry Voice (Telephony) signals that provides a smooth arrival rate, and hence high quality.

BRIEF DESCRIPTION OF THE DRAWINGS

FIGS. 1–8 depict various aspects and features of the present invention in accordance with the teachings herein.

DETAILED DESCRIPTION

The aspects, features and advantages of the present invention will become better understood with regard to the following description with reference to the accompanying drawings. What follows are a preferred embodiments of the present invention. It should be apparent to those skilled in the art that the foregoing is illustrative only and not limiting, having been presented by way of example only. All the features disclosed in this description may be replaced by alternative features serving the same purpose, and equivalents or similar purpose, unless expressly stated otherwise. Therefore, numerous other embodiments of the modifications thereof are contemplated as falling within the scope of the present invention as defined herein and equivalents thereto. Use of absolute terms, such as "will not," "will," "shall," "shall not," "must," and "must not," are not meant to limit the present invention as the embodiments disclosed herein are merely exemplary.

Figure 1:
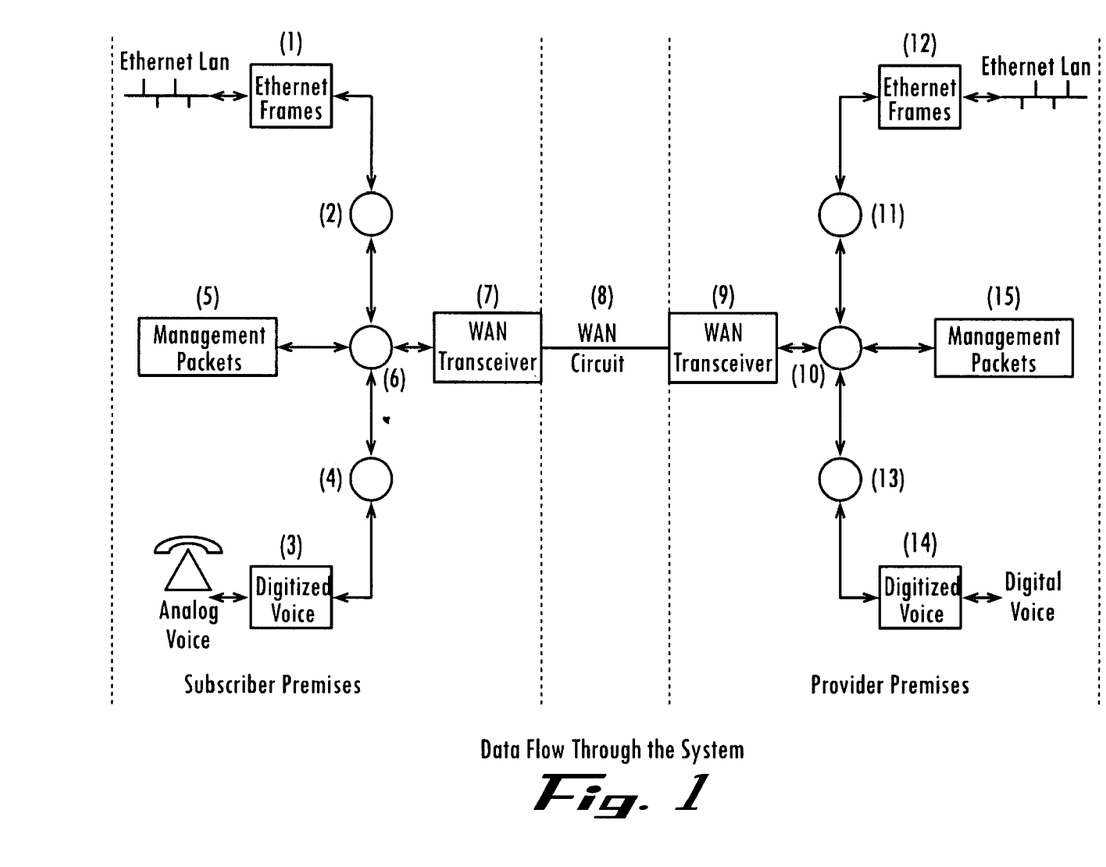

FIG. 1 is a representation of major functional elements of a system that allows Ethernet LAN equipment and Voice equipment to share a single WAN circuit from a Subscriber Premise (home, office, campus building, business, etc.) to a Provider Premise (Central Office, ISP POP, MIS Department) in a manner which provides signal quality for the Voice equipment and at the same time makes effective use of the WAN circuit bandwidth to support Ethernet LAN traffic.

Item (1) provides the Ethernet physical layer interface and media access controller (MAC) that connects the Subscriber Premise device to the Ethernet LAN. This is a Standard interface compatible with any and all Ethernet networking equipment.

Item (2) may be activated when there are signals from the Voice equipment. If no Voice signals are present, Ethernet Frames are transmitted through the equipment unmodified. Item (2) is a software algorithm that is responsible for fragmenting Ethernet Frames into labeled packets as it passes through the circuit. At the receiving end of the WAN circuit this algorithm uses the labels to reassemble the Ethernet Frame into its original size. A unique aspect of this algorithm is that the packet sizes that the Ethernet Frames are fragmented into are selected by the equipment according to the line rate in use on the WAN circuit. These values are contained in a table of values within the software. The values in this table are computed to ensure that the maximum time that an Ethernet packet can monopolize the WAN circuit is short enough to ensure that Voice packets are delivered smoothly through the system. For example, a CODEC operating at the nominal sampling rate of 64 Kbps produces a new 16-byte value each 2 milliseconds. To allow these 16 bytes to flow through the system uninterrupted, the algorithm takes into account the WAN line rate in use and the 16 bytes of Voice data and combines this information with the known overhead of the HDLC Controller. The formula is:

Packet Size in Bytes=[(0.002 Seconds*WAN Line Rate in Bits per Second)/8 Bits per Byte]−26

For example,

| | |
|---|---|
| Ethernet Packet HDLC Overhead = | 2 Flag Bytes |
| | 2 CRC Bytes |
| Algorithm Overhead = | 1 Identifier Byte |
| Voice Packet HDLC Overhead = | 2 Flag Bytes* |
| | 2 CRC Bytes* |
| Algorithm Overhead = | 1 Identifier Byte* |
| Voice Packet Data = | 16 Bytes* |
| Timing Accuracy Factor = | 26 Bytes |

To support more than one Voice channel, 16 bytes plus HDLC Overhead and the Identifier Byte are added to the Timing Accuracy Factor for each new Voice channel desired.

For example: If the WAN Line Rate=2,320 Kbps

Then Packet Size=554 Bytes

This size of Ethernet packet combined with the algorithm in Item (6) ensures that the Voice data arrival rate is 64 Kbps regardless of the WAN line speed or LAN traffic.

The table of values this generates for a particular piece of WAN equipment varies according to the WAN line rates in use. Provided below are some examples for the SDSL based product of the present invention.

| Line Rate | Packet Size |
|---|---|
| 2,320 Kbps | 554 Bytes |
| 2,064 Kbps | 490 Bytes |
| 1,552 Kbps | 362 Bytes |
| 1,040 Kbps | 234 Bytes |
| 784 Kbps | 170 Bytes |
| 528 Kbps | 106 Bytes |
| 400 Kbps | 74 Bytes |
| 272 Kbps | 42 Bytes |

The technique for low overhead fragmentation and reassembly of Ethernet Frames is part of the operation of Item (2). Prior art systems and methods are very time consuming and costly in terms of the amount of memory a system requires because data is moved several times as it passes through a device. The fragmentation and reassembly scheme used in Item (2) of the present invention allows for Ethernet Frames to be written into memory only once on their way through the device, while at the same time these Frames are fragmented into the required packet sizes for the WAN circuit. When the fragmented packets are received at the other end of the WAN circuit, they need to be reassembled into the original Ethernet Frames for delivery to the LAN. This requires a method for the receiving end device to know when it has a complete Frame. The software in Item (2) also implements a method for identifying a complete Frame.

Ethernet Frames are received by Item (1) and placed into memory in the device. The presence of the Frame in memory triggers the software in Item (2) to begin to send it to the WAN Transceiver (7) for transmission over the WAN circuit (8). Item (2) uses the Packet Size indicated by the WAN line rate and computes the location of the last byte in a packet of this size within the memory range of the buffered Frame and adds one to it. It Reads and holds this byte from the Frame and overwrites an Identifier into this byte in the Frame. Exemplary Identifiers may include:

| | |
|---|---|
| 01H | Complete Ethernet Frame |
| 02H | First Packet of an Ethernet Frame |
| 03H | Middle Packets of an Ethernet Frame |
| 04H | Last Packet of an Ethernet Frame |

The algorithm then passes the address and packet size information for this packet (which now has an additional byte added by the Identifier code) to the DMA controller. The DMA controller then handles the transfer of this packet from device memory to the WAN Transceiver that transmits it over the WAN Circuit. The software algorithm in Item (2) then writes the saved byte that was replaced by the Identifier back into its original location and this becomes the first byte of the next packet. This pointer manipulation technique fragments the Frame into the desired packet sizes without requiring multiple moves of the Frame in device memory.

On the WAN Circuit receive side, the packets are received by the Transceiver (9) and written into memory by the DMA controller. The software algorithm (11) then uses the Identifiers to recognize the type of packet and to determine when it has a complete Ethernet packet. As it reads the Identifiers they are removed and the original Frame is sent to the Ethernet LAN by the MAC and physical interface circuitry in Item (12).

This scheme supports Full Duplex operation, so descriptions of Items (1) and (12), (2) and (11), and (7) and (9) may be identical.

Item (3) provides a standard analog telephone line interface style FXS which allows for connection of any standard analog telephone, modem, or Fax equipment. Item (3) contains the physical layer interface and the Subscriber Line Interface Circuit (SLIC) required by Voice equipment. It also contains the CODEC that digitizes these analog signals for transmission through the device. The software in Item (4) controls the SLIC/CODEC circuits and handles Off Hook/ On Hood and Ringing signaling. In addition this software transfers 16 byte Voice packets between Item (3) and Item (7), the WAN Transceiver. Voice packet Identifiers are added as the last byte of each packet and the restoration of the original packet stream at the receiving end removes these Identifiers. In the described embodiment, the Voice Packet Identifiers are 80H to 8FH. Bits 0–3 of this byte contain signaling information for the telephone line operation.

Item (5) supports two small Management tasks. As a test of WAN Circuit quality, a 32 byte Management packet is sent across this circuit every 1 seconds. If the receiving end gets the packet and can decode it, the Link LED on our devices is blinked as a visual indication that not only is the WAN Circuit up, but that it has sufficient quality to allow for the error free transmission of data. The function of Item (5), which pertains to mixing Ethernet and Voice packets over the WAN circuit, is that this 32-byte packet contains a code, which indicates that the equipment sending the packet is a unit that supports mixed Voice and Ethernet. This is done N for compatibility. Optionally, if this code is absent, the devices will revert to Ethernet-only operation and none of the features which support mixing in Voice packets will be activated. This preserves all WAN Circuit bandwidth for the LAN traffic.

Item (6) controls the flow of all packets to/from the WAN Transceiver. It uses a priority scheme that provides high quality Voice signals. The scheme is very simple. If there are Voice packets available, they are sent. If there are no Voice packets available it sends one Ethernet packet and then looks for Voice packets again. The priority scheme is Voice $1^{st}$, Management $2^{nd}$, Ethernet $3^{rd}$. Management packets are generally sent on a 1 second interval.

Item (7) is the WAN transceiver that provides the physical and media access controllers that support the WAN circuit. The physical layer can be, for example, xDSL, clear channel T1, clear channel E1, Wireless, or FTTH (Fiber to the Home). Other known physical layers may be used as well. The media access controller may be an HDLC controller. This allows for reliable communications over the WAN circuit with the minimum necessary overhead, preserving more bandwidth for actual user traffic.

On the Provider Premises side of FIG. 1 all the functions are duplicates of those shown on the Subscriber Premises side except with respect to Item (14). Item (14) can either convert the Voice packets back to analog Voice signals of the FXO type for connection to a telephone switch, or can keep the signals digital and send them into the PSTN infrastructure in T1 DS0's using standard T1 signaling techniques to control the telephone circuit.

Figure 2:
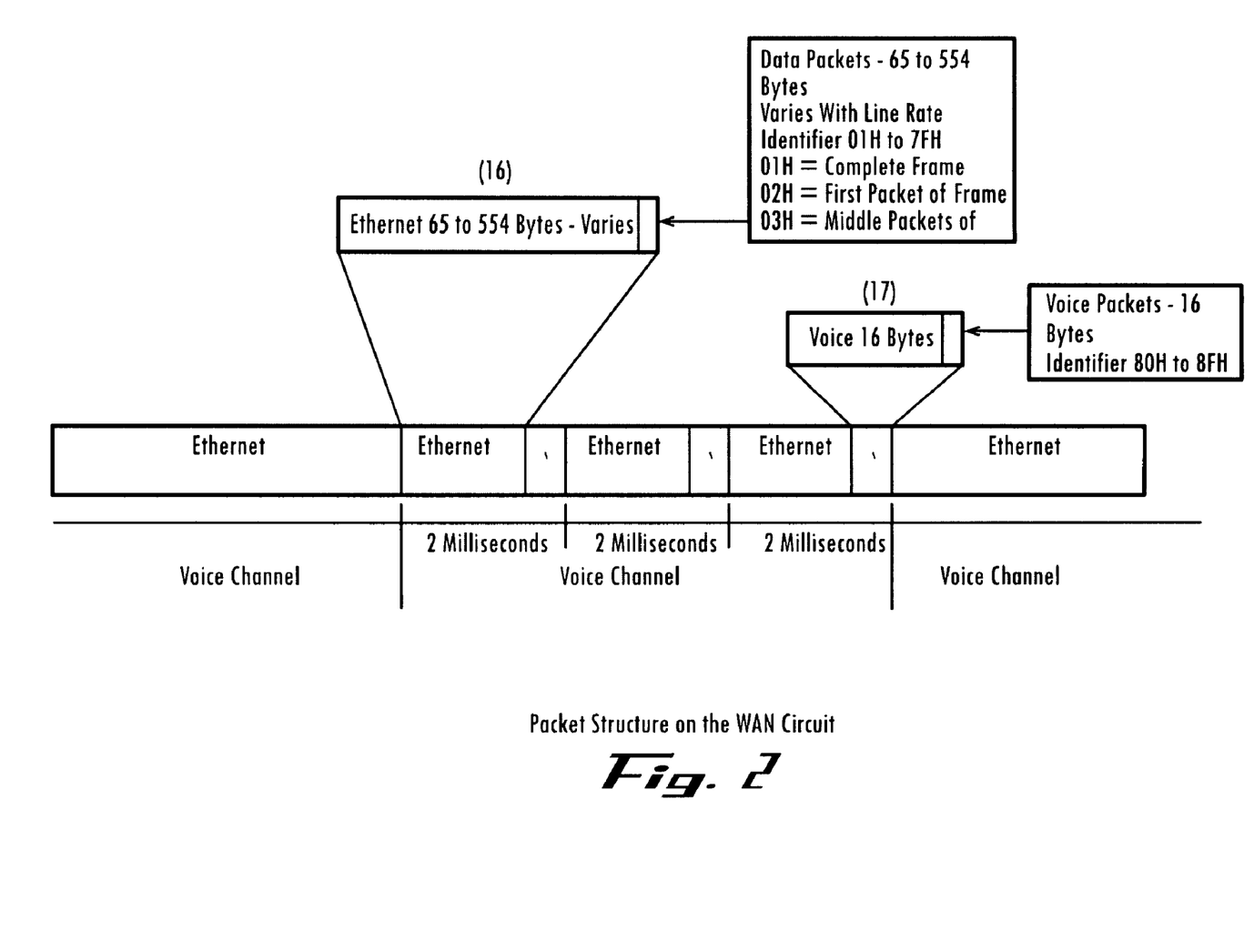

In FIG. 2, Items (16) and (17) graphically represents the mixing of Ethernet and Voice packets on the WAN circuit including details about the Identifiers used in each packet type. This diagram shows how the solution switches between traditional bridging operation where Ethernet Frames of any size that arrive are forwarded through the device and out the WAN circuit to our technique for dynamic time division multiplexing which ensures a 64 Kbps channel across the WAN circuit for Voice data for each Voice channel whenever Voice signals are active.

The solution of the present invention differs from that used in the prior art to support Ethernet and Voice using ADSL over Local Subscriber Loops in that it supports symmetrical upstream/downstream communications and will work for circuit types where dividing up the frequency bands is not possible such as SDSL, T1 and E1. The present invention is not limited by requiring that the spectrum of the circuit be divided between analog Voice signals and Digital Data signals. This difference also means that our solution does not require the "POTS Splitter", the filter necessary to ensure that the frequency bands are separated.

The present invention differs from that used for ATM based solutions in that the size of Ethernet packets sent across the WAN circuit can be significantly larger, requiring less complex circuitry and reducing the overhead which reduces the available bandwidth on the WAN circuit. It also delivers a smooth stream of Voice data that reduces the complexity of the circuits necessary for handling the Voice data. ATM also has complex configuration requirements that are minimized in our solution. This allows operational connections to be established by simply connecting the wires. This is significant at the system and enterprise level as it reduces the costs to install, configure and maintain our solution.

This solution differs from that used in T1/E1 Drop & Insert equipment as it works over an unstructured (Clear Channel) WAN circuit and only reserves bandwidth for the Voice data when the Voice channel is actually in use. These circuits are typically much less costly to provision and hence to purchase as they require less circuitry to implement. In addition, our solution allows for much larger Ethernet packets to be sent across the WAN circuit resulting in greater effective bandwidth available for user data with less overhead lost to framing and lower system costs as less packet handling is required.

VOIP solutions encapsulate the Voice data into IP packets and then add additional protocols which use information contained in fields of the IP packets to signal to equipment that these Voice packets must receive priority treatment in order to maintain the arrival rate that Voice signals demand. This system perspective adds processing complexity to the solution that we do not think is necessary to solve the problem of mixing Voice and Ethernet data on a WAN circuit. Like ATM, the packet sizes of the Voice packets will be larger than the 16 bytes of our solution and so will require smoothing to remove jitter.

As shown in FIG. 3, an exemplary Voice Over xDSL system architecture, the customer premises are connected to the Service Provider Premises via subscriber loops. The customer premises may include an Ethernet connection and telephone in communication with a CPE device associated with subscriber loops that may be owned or leased by a service provider. The subscriber loops are further connected to the service provider via a digital subscriber loop access. At the service provider premises a T1 circuit connects Voice from each access blade to Voice Switches.

Figure 4:
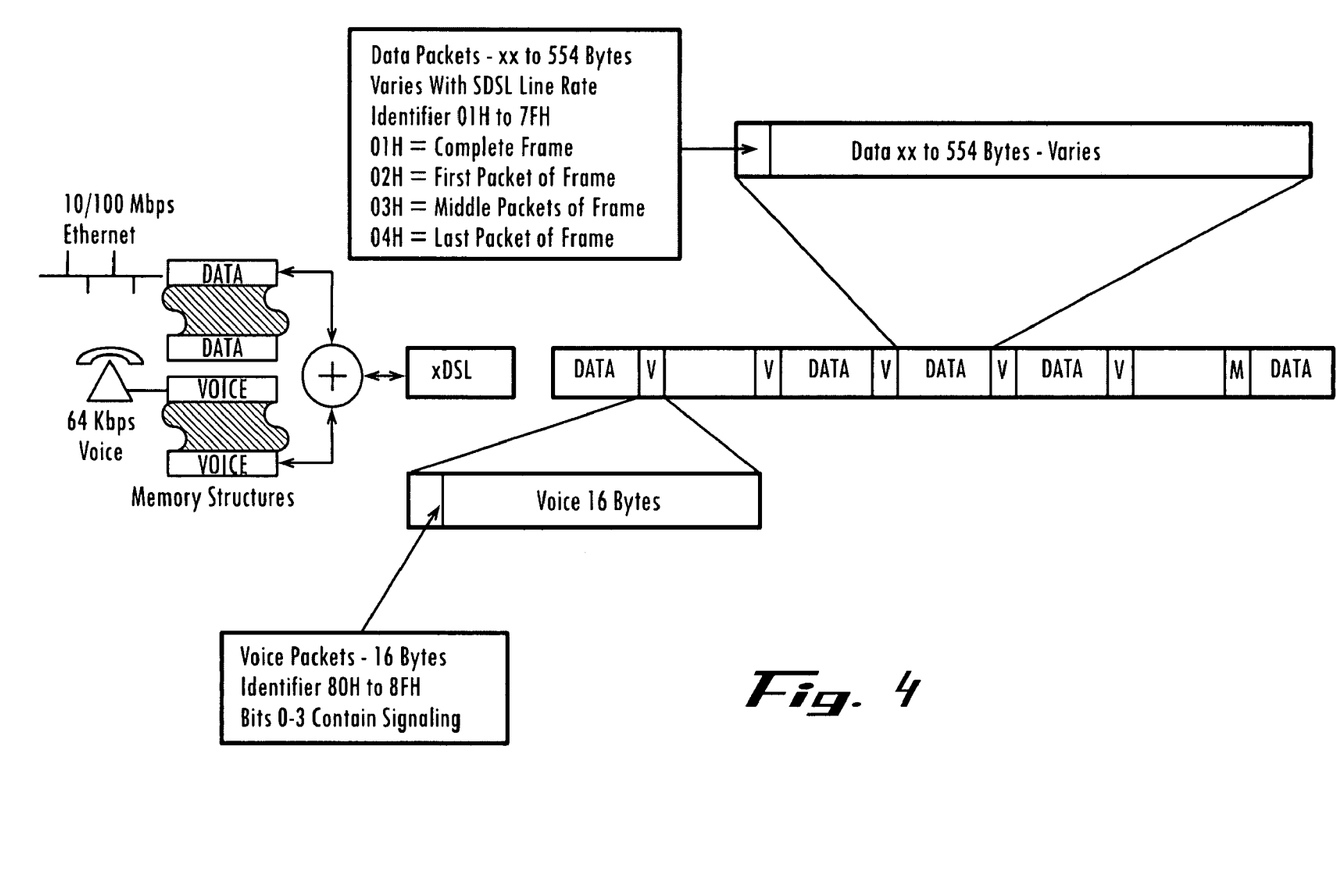

FIG. 4 is provided as an exemplary Voice Over xDSL Dynamic Time Division Multiplexed data packet in accordance with the present invention.

Figure 5:
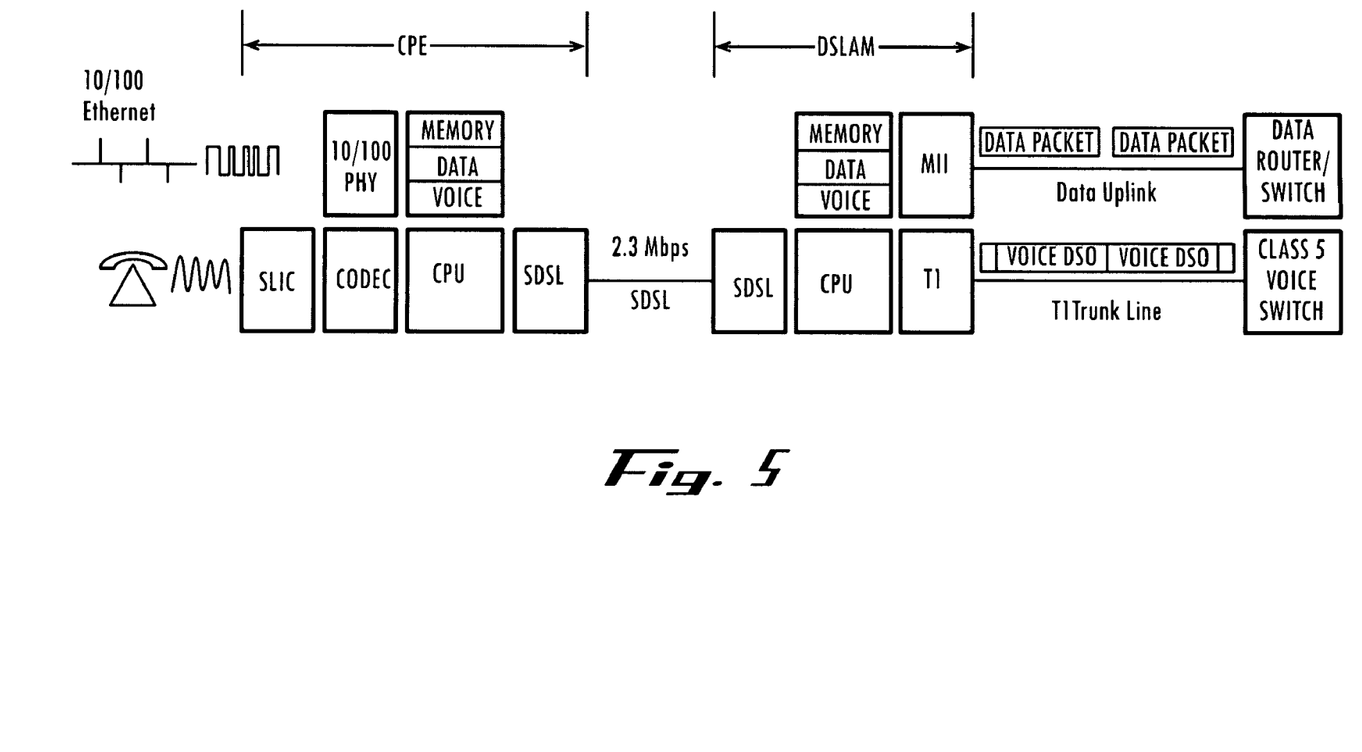

FIG. 5 is provides exemplary Voice Over xDSL functional circuit elements. Voice is given priority and injected into a data stream using the dynamic TDM of the present invention. In this example, SLIC may provide 2-to-4-wire conversion; analog pulse shaping; off hook/on hook detection; and ringing voltage. CODEC may provide D/A conversion and off hook/on hook/ringing signals. T1 framer may provide extended super frame or super frame. The CPU voice function may provide off hook signal, on hook signal ringing signal as well as the ability to pass through all other signals.

Figure 6:
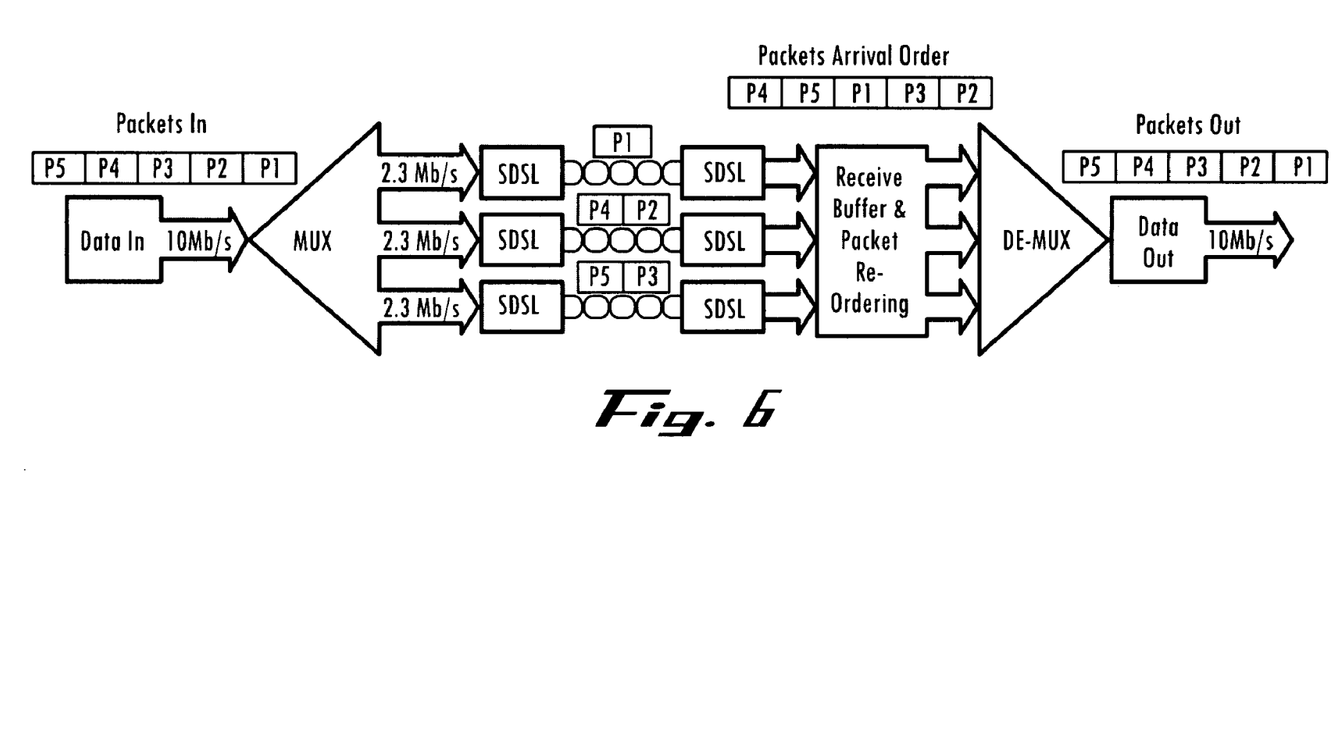

FIG. 6 is provided as an exemplary IMUX packet handling application wherein the IMUX can be used with any WAN interface; for example, IDSL, SDSL, T1 or E1. As shown, inverse multiplexing creates a single virtual physical layer interface. The IMUX packet handling logically groups two or more actual physical interfaces, creates WAN pipes 2×, 3×or even 24×the bandwidth of a single port and is used as if it were a single physical pipe. Packets are striped across the available bandwidth using a first available circuit algorithm. The IMUX packet handling ensures in order packet arrival as required by some applications. Additionally, if a circuit fails, the algorithm of the present invention continues to use all operational circuits and failed circuits are automatically added back in when they become operational again. Furthermore, by providing aggregated bandwidth little or no management through use of individual links is required.

FIG. 7 is provided as an exemplary Voice Over xDSL TDM and IMUX application. As shown in FIG. 7, data, voice and management packets share the xDSL circuits. The packets are striped across the xDSL circuits and the IMUX provides for in order arrival of packets.

Figure 8:
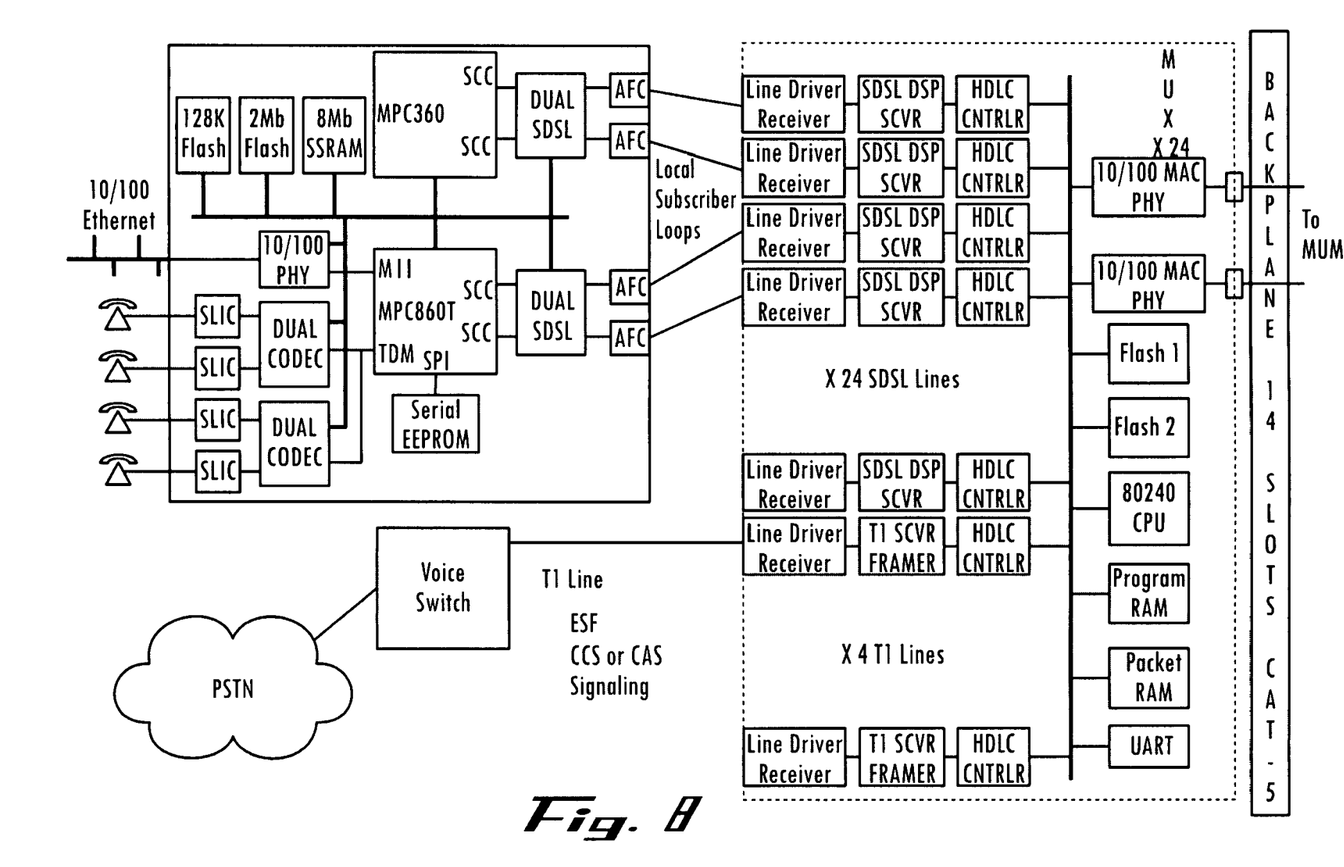

FIG. 8 is provided as an exemplary Voice Over xDSL with IMUX detailed architecture.

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto. For example, the techniques may be implemented in hardware or software, or a combination of the two as shown or in other equivalent embodiments.

It will be appreciated that the system, method of operation and product may vary as to the details of its configuration and operation without departing from the basic concepts disclosed herein.

What is claimed is:

1. A system capable of transmitting voice and Ethernet data signals over a wide-area network (WAN) circuit; said WAN circuit having a line rate; said system comprising:
   an Ethernet MAC layer interface for connecting a Subscriber Premise device between an Ethernet LAN and said WAN circuit;
   memory for storing an Ethernet frame received by the Ethernet MAC layer interface;
   a WAN transceiver;
   a telephone line interface for connecting a standard telephone line equipment to said WAN circuit; said telephone line interface containing a CODEC that digitizes analog signals for transmission of voice packets to said WAN circuit;
   fragmentation logic configured to:
      replace a first data value at a first replacement location in the stored Ethernet frame with a first frame identifier, said first replacement location based on said line rate; and
      transfer a first number of bytes from the start of the stored Ethernet frame to the WAN transceiver, said number based on said line rate; and
   a packet flow device configured to mix said fragmented Ethernet frames and said voice packets into a stream provided to said WAN circuit.

2. The system of claim 1, where the first frame identifier represents a first packet of an Ethernet frame and wherein the fragmentation logic is further configured to:
   determine a second replacement location based on said line rate; and
   replace a second data value at the second replacement location with a second frame identifier identifying a middle packet of an Ethernet frame; and
   transfer, starting at the first replacement location in the stored Ethernet frame, the first number of bytes to the WAN transceiver.

3. The system of claim 1, wherein the fragmentation logic is further configured to:
   write the first data value to the first replacement location.

4. The system of claim 1, wherein the fragmentation logic is further configured to:

calculate a fragmented packet size N, based on said line rate;

determine a first replacement location that is N+1 bytes from the start of the stored Ethernet frame; and transfer N+1 bytes from the start of the stored Ethernet frame to the WAN transceiver.

5. The system as defined in claim 4 in which N is chosen to ensure that the packets from said telephone line arrive at 64 Kbps regardless of the network line speed or Ethernet traffic.

6. The system as defined in claim 4 in which N is chosen from the following table:

| Line Rate | Fragmented Packet Size |
|---|---|
| 2,320 Kbps | 554 Bytes |
| 2,064 Kbps | 490 Bytes |
| 1,552 Kbps | 362 Bytes |
| 1,040 Kbps | 234 Bytes |
| 784 Kbps | 170 Bytes |
| 528 Kbps | 106 Bytes |
| 400 Kbps | 74 Bytes |
| 272 Kbps | 42 Bytes. |

7. The system of claim 1, where the first frame identifier represents a complete Ethernet frame, a first packet of an Ethernet frame, a middle packet of an Ethernet frame, or a last packet of an Ethernet frame.

8. The system of claim 1, where the transfer is effected by a direct memory access (DMA) transfer.

9. A system for multiplexing Ethernet packets and voice signals over a wide-area network (WAN) circuit connecting a subscriber premise and a provider premise, the WAN circuit having a line rate, the system comprising:

an Ethernet interface configured to communicate data packets to and from an Ethernet LAN;

a telephone line interface coupled to telephone equipment and configured to produce voice packets;

memory for storing an Ethernet frame received by the Ethernet MAC layer interface;

a WAN transceiver;

a fragmentation device configured to receive an Ethernet frame from the Ethernet interface and to calculate a fragmentation size N based on said line rate, and to replace a data value at the Nth byte within the stored Ethernet frame with a first frame identifier, and to transfer the first N+1 bytes of the stored Ethernet frame to a WAN interface;

a multiplexer configured to multiplex the labeled data packets with the voice packets into a stream; and wherein the WAN interface is configured to communicate the multiplexed stream of voice packets and labeled data packets over the WAN circuit.

10. The system of claim 9, where the first frame identifier represents a first packet of an Ethernet frame and wherein the fragmentation device is further configured to:

replace a second data value at a second replacement location with a second frame identifier identifying a middle packet of an Ethernet frame, wherein the second replacement location is based on said line rate; and transfer, starting at the Nth location in the stored Ethernet frame, the first number of bytes to the WAN interface.

11. The system of claim 9, wherein the fragmentation device is further configured to:

write the data value to the Nth byte within the stored Ethernet frame.

12. The system of claim 9, where the first frame identifier represents a complete Ethernet frame, a first packet of an Ethernet frame, a middle packet of an Ethernet frame, or a last packet of an Ethernet frame.

13. The system of claim 9, where the transfer is effected by a direct memory access (DMA) transfer.

14. The system of claim 9, where the first frame identifier represents a complete Ethernet frame, a first packet of an Ethernet frame, a middle packet of an Ethernet frame, or a last packet of an Ethernet frame.

15. The system of claim 9, where the transfer is effected by a direct memory access (DMA) transfer.

16. A method for multiplexing Ethernet frames and voice signals over a wide-area network (WAN) circuit connecting a subscriber premise and a provider premise, the method comprising:

receiving an Ethernet frame into memory;

receiving a voice packet;

responsive to the presence of the voice packet, labeling the Nth byte from the start of the received Ethernet frame with an identifier marking the end of a fragmented data packet, said identifier indicating where the fragmented data packet fits within the received Ethernet frame, wherein N is based on a line rate of a WAN transceiver coupled to the WAN circuit;

transferring N bytes from the start of the received Ethernet frame to the WAN transceiver; and multiplexing the labeled data packets and the voice packets over the WAN circuit.

17. The method of claim 16, wherein N is based on a sampling rate at which the voice packets are produced.

18. The system of claim 16, wherein the multiplexing step further comprises:

multiplexing the labeled data packets with the voice packets over the WAN circuit according to a priority scheme whereby one voice packet alternates with one labeled data packet.

19. The method of claim 16, where the first frame identifier represents a first packet of an Ethernet frame and further comprising:

replacing a second data value at a second replacement location with a second frame identifier identifying a middle packet of an Ethernet frame, wherein the second replacement location is based on said line rate; and transferring, starting at the Nth location in the stored Ethernet frame, the first number of bytes to the WAN transceiver.

20. The method of claim 16, further comprising:

writing the data value to the Nth byte within the stored Ethernet frame.

* * * * *

UNITED STATES PATENT AND TRADEMARK OFFICE
CERTIFICATE OF CORRECTION

| | | |
|---|---|---|
| PATENT NO. | : 7,080,012 B2 | Page 1 of 1 |
| APPLICATION NO. | : 10/054246 | |
| DATED | : July 18, 2006 | |
| INVENTOR(S) | : Latimer, Jr. | |

It is certified that error appears in the above-identified patent and that said Letters Patent is hereby corrected as shown below:

Column 1, line 24, after "in", delete "m".
Column 1, line 65, after "who", delete "W".
Column 2, line 31, after "bandwidth", delete "lit".
Column 6, line 8, after "done", delete "N".

Signed and Sealed this

Fifth Day of December, 2006

JON W. DUDAS
*Director of the United States Patent and Trademark Office*